Dec. 1, 1925.  1,563,967

R. W. CULLEN

ROUTE SHEET

Filed Oct. 11, 1924

WASHINGTON TO FREDERICKSBURG

FREDERICKSBURG TO WASHINGTON

READ DOWN

0.0. Washington, D. C., at A.A.A headquarters, 1108 16th Street. South on 16th Street. Left on K St. Right on 14th St. Follow trolley—straight across Pennsylvania Avenue through Potomac Park. Follow trolley.

2.2 Over Highway Bridge into Virginia. Right beyond bridge.

3.5 Fork left. (Right is to Arlington Cemetary.)

4.8 Hume School.

6.3 Fork Right (Either way is to Alexandria).

8.5 Pass George Washington National Masonic Memorial.

8.6 Left on King St.

9.4 Alexandria. (Little Tea House.) King and Alfred Sts. Right on Alfred—Right at end of road, then left—9.8.

15.3 Right. (Left is to Mt. Vernon.)

18.3 Pass Fort Humphreys.

19.7 Accotink. Through.

22.3 Pohick. Straight.

24.1 Lorton. Straight.

27.6 Occoquan. Right, then left.

29.8 Woodbridge. Straight.

38.7 Dumfries. Left at end of road—Cross bridge and right on main road.

40.3 Fork Right (Left is to Quantico).

51.6 Stafford Court House.

57.9 Small ford.

60.1 Falmouth. Straight, over concrete bridg.

61.7 Fredericksburg. Commerce and Princess Anne St. Princess Anne Hotel Jenkins Motor Co.

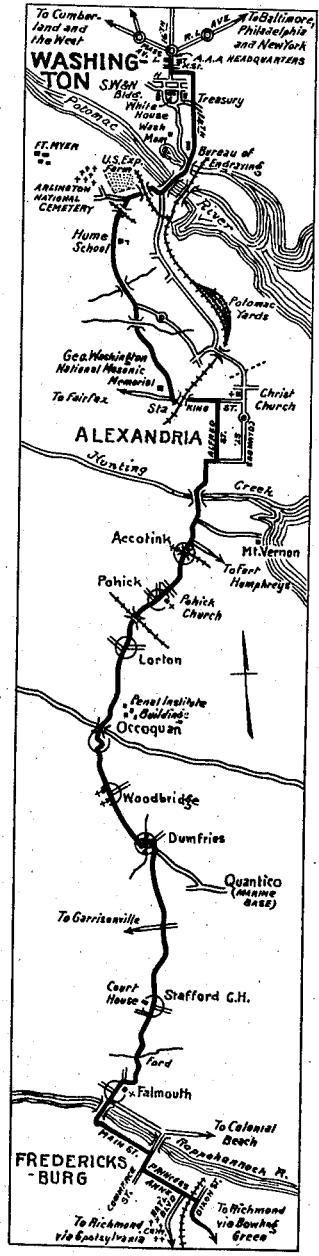

READ UP

61.7 Washington, D. C. at A.A.A Headquarters, 1108 16th St. Right on 16th St. Left on K St. Straight into 14th St. Follow trolley across Pennsylvania Ave.

59.5 Left over Highway Bridge into District.

58.2 Bear Right (Left into Arlington 56.9 Hume School.

55.4 Pass road on right.

53.2 Pass George Washington Masonic Memorial.

53.1 Right after R R. underpass.

52.3 Alexandria. Left on King St.

51.9 Right. Left into Alfred St. (Little Tea House).

46.4 Left. Right is to Mr. Vernon.

43.4 Pass Fort Humphreys.

42.0 Accotink. Through.

39.4 Pohick, Straight.

37.6 Lorton.

34.1 Occoquan. Left, then right.

31.9 Woodbridge.

23.0 Dumfries. Left across bridge and Right.

21.4 Fork. Left (Right is to Quantico).

10.1 Stafford Court House.

3.8 Small ford.

1.6 Falmouth.

Right across concrete bridge.
Turn left on Main St.
Go north on Commerce St.

0.0 Fredericksburg. Commerce and Princess. Princess Anne (H). Jenkins Motor Co. (G).

*Russell W. Cullen* INVENTOR

By *Ople R. Singleton*

Attorney

Patented Dec. 1, 1925.

UNITED STATES PATENT OFFICE.

RUSSELL W. CULLEN, OF HYATTSVILLE, MARYLAND, ASSIGNOR TO AMERICAN AUTOMOBILE ASSOCIATION, OF WASHINGTON, DISTRICT OF COLUMBIA, A CORPORATION OF CONNECTICUT.

ROUTE SHEET.

Application filed October 11, 1924. Serial No. 743,066.

*To all whom it may concern:*

Be it known that I, RUSSELL W. CULLEN, a citizen of the United States, residing at Hyattsville, in the county of Prince Georges, in the State of Maryland, have invented certain new and useful Improvements in Route Sheets, of which the following is a specification.

My invention consists in a new and useful improvement in route sheets, and is designed to produce a route sheet in which there is a cartographic delineation of the route of travel accompanied by an enumerated exposition of information relative to the route, the delineation and exposition being so disposed as to offer visual interrelation between corresponding data upon each feature of the sheet.

In the drawing filed herewith, I have illustrated a route sheet produced by my improved process and reference thereto will render obvious the nature of my invention for the scope of which I refer to the claims appended hereto.

In the drawing, the cartographic delineation placed in the middle of the sheet consists of a diagrammatic map of the route to be followed by a tourist travelling by automobile from a certain designated point in Washington, D. C. to a certain designated point in Fredericksburg, Va. It is to be understood that in this feature of the sheet there are to be exhibited any and all features of a cartographic nature requisite to a satisfactory delineation of the route disclosed, such as the diagrammatic indication of landmarks, etc.

The sheet illustrated in the drawing is further provided with an enumerated exposition of information relative to the aforesaid route for a trip from Washington, D. C. to Fredericksburg, Va. This enumeration forms a column of information arranged to the left of and in immediate juxtaposition to the map. This enumeration, constituting what is usually referred to as "log" of the route, comprises a series of statements, reading in order from the top of the column downward, designed to advise the user of the sheet of such information relative to the route pursued, as for instance the mileage between designated points, directions for making proper turns, descriptions of places or landmarks, etc.

The sheet is further provided with a second enumerated exposition of information forming a column arranged to the right of and in immediate juxtaposition on the map. This enumeration, constituting a second or reverse "log" of the route delineated upon the map, comprises a series of statements reading in order from the bottom of the column upward designed to advise the user of the sheet of information relative to the route pursued upon a trip from a certain designated point in Fredericksburg, Va. to a certain designated point in Washington, D. C.

It is to be noted that the various features shown on the map bear the same relation to one another as the items of information in the columns relating to such features bear to one another. For example, it will be seen that the distance between the point on the map indicating the location of the turn of the route in the village of Occoquan and the point on the map indicating the village of Woodbridge is the same as the distance in each enumeration between the item of information relating to the village of Occoquan and the turn to be made at that point, and the item of information relating to the village of Woodbridge and the instructions as to the route at that point. The foregoing described disposition of the features of the map and the logs produces a route sheet in which the user can find the position of any feature of the route on the map with the information relating thereto in either log, placed immediately at the side of the map on a line with the feature on the map. With this sheet the user's eye can pick up a certain feature on the map and note the information relative thereto, or can pick up a certain item of information in either log and note the feature on the map to which it relates. The sheet thus affords means of rapid reference of map to log, or vice-versa.

I will now describe the process by which my improved route sheet is produced. I first draw a map showing the desired route and having all of the required signs and symbols thereon to identify the desired features of the route. I then list in order all the items of information which compose the log applicable to the desired route. I then modify the dimensions of the map and the spaces between the items of information in the log so that the spaces between the features on the map and the spaces between the items of information shall coincide. This step in the process, consists at times in designing and recording the cartographic indicia to correspond with requisite spacing of the enumerated items of information, and consists at times in disposing the items of information to correspond with their related cartographic indicia. For example, the items of information relating to the route through cities are necessarily more elaborate and therefore require more space than the items relative to the route in the country. Such items requiring a certain allowance of space in the log, the corresponding portion of the route on the map has to be enlarged to occupy space corresponding to the space required in the log. On the other hand, the spaces between certain points on the map in that portion of the route in the country require certain spaces to delineate the cartographic features required to be placed on the map. The corresponding items of information in the log have to be spaced farther apart than their size would require, in order that they may occupy spaces corresponding to the location of the features on the map to which they refer.

Having described my invention, what I claim is:

1. In a route sheet, the combination of a column bearing cartographic indicia relative to a route of travel; and a second column bearing enumerated informative data relative to said route of travel, certain items of cartographic indicia being disposed in the first column in accordance with the location of certain items of informative data in the second column, and certain other items of informative data in the second column being disposed in accordance with the location of certain items of cartographic indicia in the first column.

2. In a route sheet, the combination of a map; and a log, the position of certain features on the map being determined by the position of certain items of information in the log, and the position of certain other items of information in the log being determined by the location of certain features on the map.

3. In a route sheet, the combination of a column bearing cartographic indicia relative to a route of travel; a second column bearing enumerated informative data relative to said route in one direction of travel; and a third column bearing enumerated informative data relative to said route in the opposite direction of travel, certain items of cartographic indicia being disposed in the first column in accordance with the location of certain items of informative data in the second and third columns, and certain other items of informative data in the second and third columns being disposed in accordance with the location of certain items of cartographic indicia in the first column.

4. In a route sheet, the combination of a map; a log of the route in one direction of travel; and a log of the route in the opposite direction of travel, the position of certain features on the map being determined by the position of certain items of information in the logs, and the position of certain other items of information in the logs being determined by the location of certain features on the map.

In testimony whereof I affix my signature.

RUSSELL W. CULLEN.